United States Patent [19]
Hayase et al.

[11] 3,825,750
[45] July 23, 1974

[54] METHOD AND APPARATUS FOR DETECTING DEFECTIVE SEALS ON BAG-SHAPED ARTICLES

[75] Inventors: Masao Hayase, Nagoya; Yoshiyuki Hayasaka, Tsushima; Yozo Araki, Nagoya, all of Japan

[73] Assignee: Mitsubishi Jukogyo Kabushiki, Tokyo, Japan

[22] Filed: Dec. 15, 1972

[21] Appl. No.: 315,509

[30] Foreign Application Priority Data
Dec. 21, 1971   Japan.............................. 46-120128

[52] U.S. Cl.............. 250/223 R, 356/196, 73/49.4, 209/111.7
[51] Int. Cl.......................................... C10g 13/00
[58] Field of Search ....... 209/111.5, 111.7; 73/49.3, 73/49.4, 41.4, 45.4, 40; 356/237, 240, 196, 197, 198; 250/219 DF, 223 B, 223 R, 576

[56] References Cited
UNITED STATES PATENTS

| | | | |
|---|---|---|---|
| 2,162,209 | 6/1939 | Trutner.............................. | 73/45 X |
| 2,408,202 | 9/1946 | Dickman............................. | 73/41.4 |
| 2,866,379 | 12/1958 | Veit.................................. | 250/218 |
| 3,027,753 | 4/1962 | Harder, Jr......................... | 73/49.3 X |
| 3,591,944 | 7/1971 | Wilcox............................... | 79/49.3 X |
| 3,683,677 | 8/1972 | Harris................................ | 73/49.2 |

*Primary Examiner*—Walter Stolwein
*Attorney, Agent, or Firm*—Cushman, Darby & Cushman

[57] ABSTRACT

Method and apparatus capable of not only automatically detecting seals on bag-shaped articles that are defective, but also automatically ejecting the defectively sealed bags as they move along a conveyor.

7 Claims, 4 Drawing Figures

PATENTED JUL 23 1974

METHOD AND APPARATUS FOR DETECTING DEFECTIVE SEALS ON BAG-SHAPED ARTICLES

BACKGROUND OF THE INVENTION

The instant invention is directed to a method and apparatus that detects whether or not there is a defective seal located on a bag-shaped article, such as a plastic tube and the like.

The apparatus is adapted to (1) automatically detect the existence of defective seals on bag-shaped articles, and (2) automatically eject the articles having the defective seals.

BRIEF DESCRIPTION OF THE PRIOR ART

Bag-shaped articles are comprised of materials that include polyethylene, vinyl, polyamid, plastic laminates, metal, rubber and the like, which have seal portions that are formed by sealing the open end portion of the bag-shaped articles by any of a number of techniques, such as high requency welding, supersonic welding, direct heating welding, pressed welding, etc.

However, in the manufacture of these bags, there exists a danger that the sealed portions which are sealed by the above-mentioned welding techniques are defectively welded over at least a portion of the sealed portions. The extent of the defect of the seals is various, and in some instances, only when an external force is applied to the seal and the contents leak out, is it apparent that the sealed portion is broken. Furthermore, this slight defect in the seal cannot be detected at all when the seal is manufactured, thereby resulting in a sealed end portion which is continually kept open.

Heretofore, the detection of defectively sealed articles and the ejection of the same from a conveying means, has been accomplished entirely by relying upon a visual inspection by an operator. Therefore, it is extremely difficult to eject articles that are defective to the extent that an external force is required to be applied thereto in order to indicate that a seal is first broken. In addition, attempts to automate the production line for charging the contents and for packaging the bags so as to save in labor and to speed up production of the bags results in increased difficulty in the detection of defectively sealed articles. The difficulty increases to such an extent that it becomes a bar against automation of an entire production line that can manufacture bag shaped articles.

SUMMARY OF THE INVENTION

In order to obviate the aforenoted disadvantages associated with the prior art, it is an object of the present invention to accomplish the detection as well as the ejection of defectively sealed articles automatically.

The instant invention also has an additional object of automating an increased rate of detection and ejection of any defective articles.

In order to achieve the above objects, the essence of the present invention exists in an apparatus, characterized in that said apparatus comprises a pressure means for pressing bag-shaped articles with a pressure that is lower than an admissible internal pressure in the article having the sealed ends of the articles aligned in a fixed direction as they are conveyed along by conveying means. A carrier means is also combined with the conveying means, which is so adapted that if an article is pressed by the pressure means and the seal is defective, contents of the bag-shaped article will be displaced from the bag and will adhere to the barrier means. A photo-electric detector device is effective to detect the existence of any contents that have been spilled onto the carrier means. As the photo-electric detector device detects the contents, it also transmits a signal to an ejecting device, whereby the ejecting device removes the defectively sealed article from the conveyor means.

The detection of defectively sealed articles as well as the ejection of these articles is accomplished automatically.

Other objects, advantages and novel features of the invention will become apparent from the following detailed description of the invention when considered in conjunction with the accompanying drawings.

BRIEF DESCRIPTION OF THE DRAWINGS

FIG. 1b is a planned view of the bag-shaped article or tube as illustrated in FIG. 1a;

DETAILED DESCRIPTION OF THE PREFERRED EMBODIMENT

Figure 3:
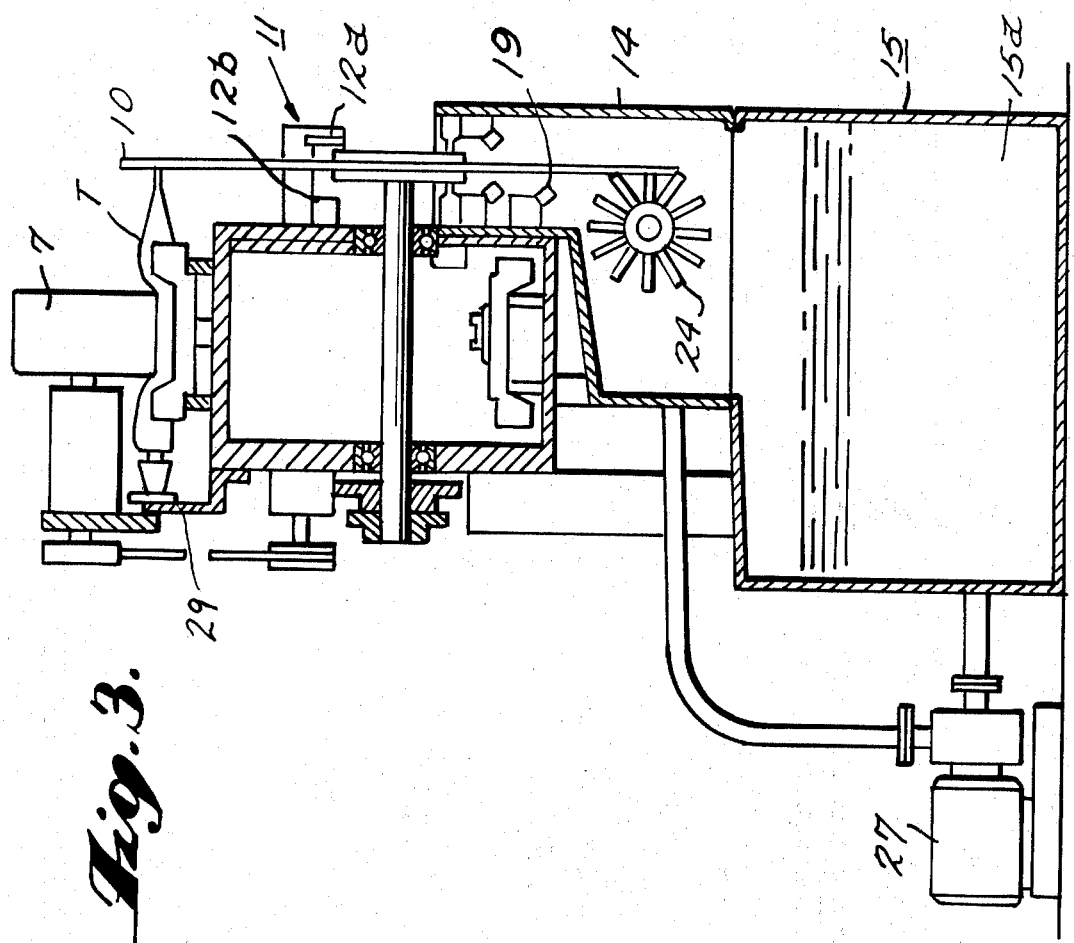
FIG. 3 is a cross sectional view taken along section line 3—3 in FIG. 2.
Figure 1A:
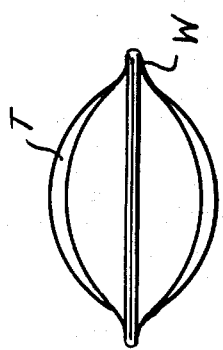
FIG. 1a is an end view of a bag-shaped article or tube representing the welded portion thereof.
Figure 1B:
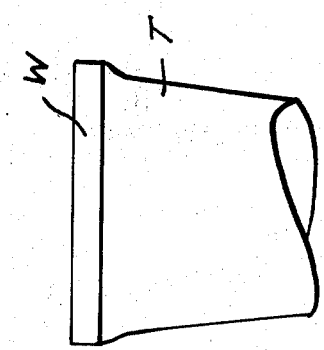
Figure 2:
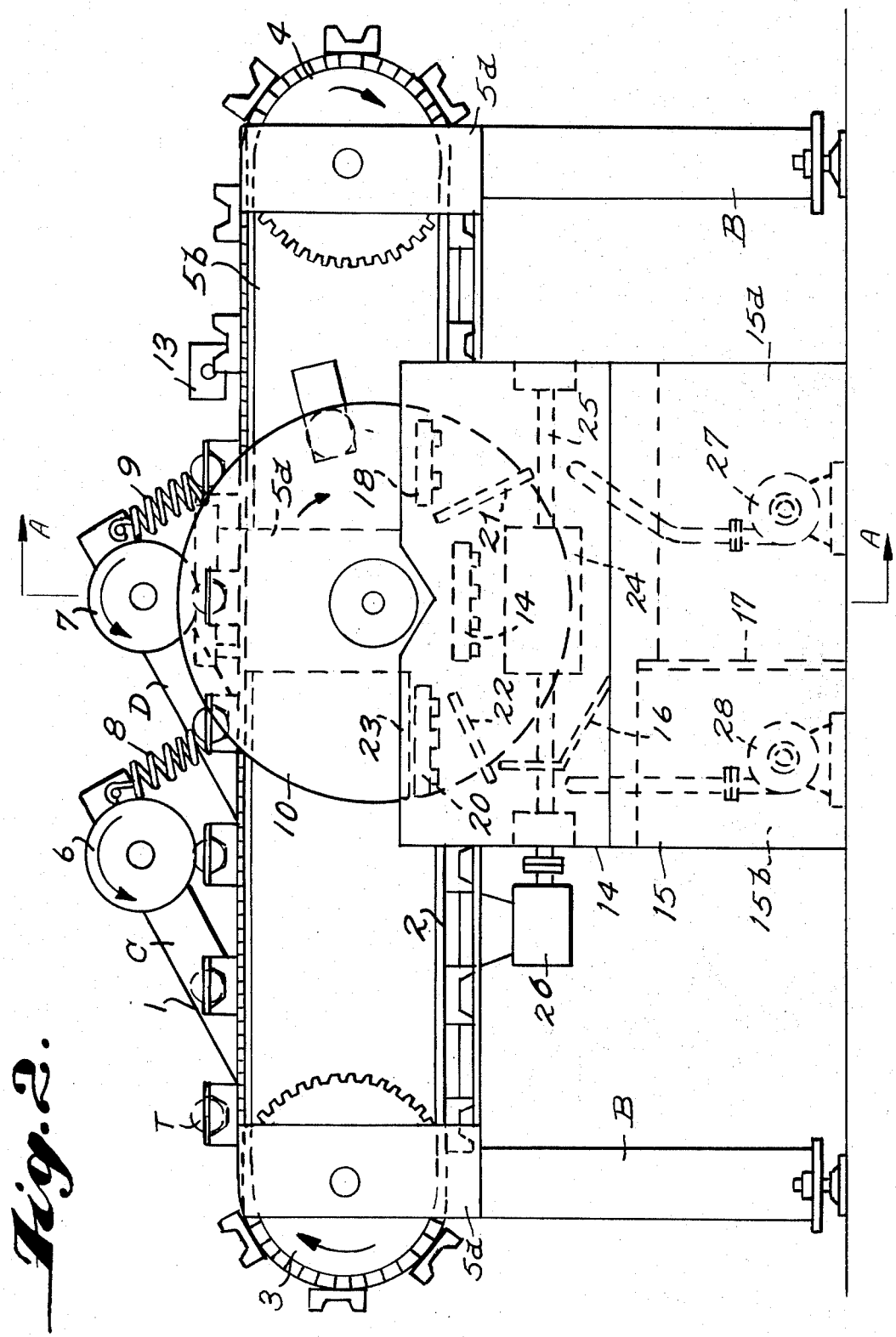
FIG. 2 is a side elevational view of a preferred embodiment of the present invention.

Now referring to the Figures of the drawings, the preferred embodiment of the instant invention discloses a bag-shaped article or tube T. This tube is illustrated as a tube of tooth paste; however, it is to be understood that other bag-shaped articles or tubes can be effectively inspected. The sealed portion of this tube is a welded portion W which has been sealed by any of a number of appropriate welding devices (not shown). The tubes T are first charged with tooth paste by means of a tube charging machine (not shown) and are thereafter welded at the portion W. After the sealing has been effectuated by this welding, the tubes are then transported to the left end of a conveyor, as viewed in FIG. 2 and thereafter is placed upon conveyor buckets 1. Each of the plurality of buckets are mounted at appropriate intervals upon chains 2. A left and a right sprocket 3 and 4 are effective to drive the chain in a longitudinal direction, moving from left to right. Frame members 5a and 5b support the left and right sprockets 3 and 4 respectively. In addition, a support pedestal B is provided that supports both frames 5a and 5b.

As the tubes T move in a rightward direction, they experience a pressure applied thereto by a first pressed roll 6 and a second pressed roll 7. Both of these pressed rolls function as a means for pressing the tubes T. It is to be noted that the tubes T have their welded portions aligned in a fixed direction as they move along the conveyor C; the importance of this will be described hereinafter.

The first pressed roll and the second pressed roll are respectively mounted on actuating members C and D. Both of these members are pivotably mounted at one end thereof on rear frame member 5b and at the other end thereof are subject to downward forces by means of springs 8 and 9 respectively. The roll 6 and 7 are rotated so that their circumferential velocity can have the same magnitude and the same direction as the traveling velocity of the conveying buckets 1. It is important to point out that there can be several other alternate means used for pressing the tubes T; for example, it is possible to form a pair of rolls that are located on the conveyor so as to be suspended therefrom and apply a downward force to the tubes as they pass thereunder.

If defectively sealed tubes do exist, the pressure exerted by these rolls will force the contents therein to leak out. The leakage contents from the tubes T are directed towards a transparent disc or carrier member 10. The carrier member or disc can be comprised of several different substances, for example, glass, plastic, or other suitable material and is rotatably mounted upon the front plane member 5a. The circumferential velocity of the transparent disc or carrier member is adjusted so as it will be equivalent to the velocity of the conveying buckets as well as the direction of the movement of the conveying buckets. A guide member 29 is provided that improves the adhesiveness of the leakage content on the disc 10. This guide member is mounted on the side of the disc which is opposite the side which is subjected to the leakage content of the tube T. As the disc 10 rotates any leakage material which is adhered on the disc will move toward a photo-electric detector device 11. This detector device is also mounted on the frame member 5a and is comprised of a light emitter 12a and a light receiver 12b. A signal is transmitted from the detector device 11 to energize a solenoid (not shown) in the ejector 13. The ejector in response to the energization of its solenoid is effective to remove any of the tubes which have a defective seal. While this embodiment has been described as using a disc 10, it is obvious that a carrier member may be provided by means of a flexible tape, a belt, or other similar device. Further, the aforenoted disc need not be a transparent disc, but instead may be opaque. If, however, an opaque disc is used, a reflection type of photo-electric detector device has to be used to detect the variation of a reflection index of light projected upon the disc.

The lower portion of the disc is inserted into an upper tank 14 that contains a washing device, so that a cleaning of the disc may be effectuated. The cleaning of the disc may be accomplished by water injection nozzles 18, 19, and 20 as well as wipers 21 and 22. Each of the nozzles and wipers are mounted within the upper portion of tank 14 and a further means brush 24, is mounted on a shaft 25 so as to be rotated by a motor 26. Beneath the upper tank 14 is mounted a lower tank 15 which is divided into a water bath 15a and a water bath 15b. The water fed to the nozzles 18, 19 and 20 is carried out by means of pump 27 and 28, which are respectively provided for in the water baths 15a and 15b. This aforenoted arrangement is effective to achieve a washing of the disc 10. As can be more clearly depicted in FIG. 2, reference characters 16 and 17 designate partitions located within the upper and lower tanks 14 and 15. Besides the afore-described method of washing the carrier disc 10, it is to be noted that the carrier disc may be manually wiped after a stoppage of the conveyor. In case a tape is used in lieu of a disc 10, the tape can be cleaned by being taken up without being treated and then discarded.

The preferred embodiment of the invention operates in an extremely simple manner. The tubes T which have been manufactured by a tube charging machine and welded at a portion W with a welding device is placed upon the conveyor bucket 1. As the conveyor buckets move longitudinally rightwardly, as viewed in FIG. 2, they are contacted by a first pressed roll 6 which is effective to apply a pressure to the tubes T at a value which is lower than an admissible internal pressure which may occur within the tube. (That is, the applied pressure must not be so great as to rupture even a non-defective seal, as that would cause rejection of all of the tubes.) As a result of this downward pressure force, exerted by the peripheral surface of roll 6, any defectively sealed tubes will have their welded sealed portion W broken, so that the contents will leak out. Thereafter, the tube T will have its broken sealed end pressed against the transparent disc 10 with the aid of the guide 29, that urges the tube thereagainst. Simultaneously with this movement effected by the guide 29, the tube is subjected to another relatively low pressure force which is exerted by means of a second peripheral 7. As a result of these aforenoted actions, an appropriate quantity of contents that have been contained within the tubes will leak out of any defectively welded tubes and will adhere to the transparent disc 10. The contents that adhere to the transparent disc 10 can be detected with the aid of the photo-electric detector 11, after the disc has been rotated through a predetermined angle which will locate the contents adjacent the detector. The ejector device 13 as aforementioned is adapted to eject the defective tubes, in response to a signal transmitted thereto from a photo-electric detector.

The contents which have adhered to the transparent disc 10 are then brought into contact with a washing device. A preliminary washing takes place by means of a nozzle 18 and a wiper 21. A secondary brush washing then takes place by means of the brush 24 and the nozzle 19. Finally, the finish washing is performed by the nozzle 20 and the wiper 22. Any water which adhered to the transparent disc is then wiped off by the wiper 23. During this washing process, the water that is used in the preliminary washing and the brush washing comes from water bath 15a which is recirculated by the pump 27. In the finish washing-cycle the water used is the water within bath 15b and is circulated by the pump 28. Fresh water is fed to the water bed 15b at a constant rate, and overflows into water bath 15a, besides it can be used for the preliminary washing. Finally, the water is then discharged through a drain (not shown).

Therefore, according to the principles embodied in the present invention, the cycle consisting of the steps of applying a pressure to a tube so that any defective tubes will have the contents therein leak out and adhere to a transparent disc, while a detection of the same by means of a photo-electric detector, can be carried out repeatedly. The detection of these leaks as well as the ejection of the defectively welded or sealed articles can be conducted continuously at high speeds, without stopping a production line wherein there is a tube charging line and/or a packaging line. Furthermore, according to the present invention, even a small pin-hole like defect in the welding, which would otherwise be overlooked on a high speed production line, if it were to be checked by visual sensing can now be detected. Consequently, by incorporating the apparatus of the present invention in a tube charging and packaging line, it is then possible to automate and speed up this production line.

Although I have shown and described my invention in what I have conceived to be the most practical and preferred embodiment, it is recognized that departures may be made therefrom within the scope of my invention, which is not to be limited to the details disclosed, but is to be accorded the full scope of the claims so as to embrace any and all equivalent structures and devices.

What is claimed as novel and unobvious and desired to be protected by Letters Patent is set forth in the appended claims.

What is claimed is:

1. A method for detecting defectiveness in sealed flexible tubes charged with liquid contents, comprising:

conveying the tubes serially past a first station wherein a squeezing force is applied in an attempt to burst the seal should the seal be defective, the squeezing force applied being of lower magnitude than one which would destroy the sealed integrity of the tube even if the seal were not defective;

then conveying the tubes serially past a second station wherein a second squeezing force no greater in magnitude than that applied at the first station is applied to each tube, while disposing the seal being tested for leakage in contact with a leakage receiving surface and advancing the leakage receiving surface between each such disposition;

automatically sensing where each tube would have leaked liquid contents onto said leakage receiving surface had such tube leaked; and if such leakage is sensed for a particular tube, automatically ejecting that tube from the series being conveyed.

2. The method of claim 1 wherein the contained liquid is toothpaste.

3. The method of claim 1 wherein the leakage receiving surface is an endless surface and wherein advancing said surface is accomplished by rotating it; the method further comprising rinsing and scrubbing said leakage receiving surface clean of leaked liquid contents downstream from where said leakage is sensed, whereby said surface is continually reused.

4. The method of claim 1 wherein the automatic sensing is accomplished by illuminating the surface where leakage is to be sensed and electrically monitoring the level of illumination coming from where the leakage is to be sensed.

5. Apparatus for detecting defectiveness in sealed flexible tubes charged with liquid contents comprising:

a conveyor for serially conveying the tubes;

a first freely rotatable roller mounted adjacent the conveyor; spring means urging the roller toward the conveyor sufficiently to rollingly interfere with the flexible tubes being serially conveyed thereby, the magnitude of such interference being set to apply a squeezing force of lower magnitude than one which would destroy the sealed integrity of such of the tubes as have non-defective seals, but of sufficient magnitude as to burst such of the seals as are defective;

a second freely rotatable roller mounted adjacent the conveyor, downstream from the first; spring means urging the second roller toward the conveyor with no greater interference than that represented by the first roller, to apply a second squeezing force to each tube;

means bearing a leakage receiving surface;

means mounting the surface means adjacent the conveyor for serial contact with each tube as each tube is squeezed by the second roller; and means advancing the surface means between each contact with successive tubes, so that each leakage produces a discrete smear of liquid on the surface;

means for automatically sensing for the presence of smears on the surface; and automatically operated means responsive to said sensing for ejecting from the conveyor each tube which has produced a smear on said surface.

6. The apparatus of claim 5 wherein the surface means is a transparent disk rotated by said advancing means; said apparatus further comprising means for rinsing and scrubbing the surface downstream from where said smears are sensed whereby said surface is prepared for reuse.

7. The apparatus of claim 6 wherein the sensing means comprises means for illuminating the disk and photoelectric means for sensing the level of illumination transmitted through the disk where said smears are produced thereon.

* * * * *

UNITED STATES PATENT OFFICE
CERTIFICATE OF CORRECTION

Patent No. 3,825,750                     Dated July 23, 1974

Inventor(s) Masao Hayase, Yoshiyuki Hayasaka & Yozo Araki

It is certified that error appears in the above-identified patent and that said Letters Patent are hereby corrected as shown below:

In the heading:

Item [73], change "Mitsubishi Jukogyo Kabushiki" to

--Mitsubishi Jukogyo Kabushiki Kaisha--

Signed and sealed this 5th day of November 1974.

(SEAL)
Attest:

McCOY M. GIBSON JR.  
Attesting Officer

C. MARSHALL DANN  
Commissioner of Patents